US012407569B1

(12) United States Patent
Yehezkel et al.

(10) Patent No.: US 12,407,569 B1
(45) Date of Patent: Sep. 2, 2025

(54) HARDWARE SUPPORTED FLOW MIGRATION

(71) Applicant: MELLANOX TECHNOLOGIES, LTD., Yokneam (IL)

(72) Inventors: Aviad Yehezkel, Yokneam Ilit (IL); Ariel Shahar, Jerusalem (IL); Gal Shalom, Givat-Avni (IL); Omri Kahalon, Yehud (IL); Yohad Dickman, Karmiel (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 18/443,859

(22) Filed: Feb. 16, 2024

Related U.S. Application Data

(60) Provisional application No. 63/553,947, filed on Feb. 15, 2024.

(51) Int. Cl.
*H04L 41/0823* (2022.01)
*H04L 12/24* (2006.01)
*H04L 41/0816* (2022.01)
*H04L 41/16* (2022.01)

(52) U.S. Cl.
CPC ............... *H04L 41/0816* (2013.01)

(58) Field of Classification Search
CPC . H04L 41/0816; H04L 41/0823; H04L 41/16; H04L 12/24; H04L 24/02
USPC .......................................... 709/220
See application file for complete search history.

(56) References Cited

U.S. PATENT DOCUMENTS

| 8,203,962 B2 * | 6/2012 | Kitawaki | H04L 43/00 370/252 |
| 9,584,595 B2 * | 2/2017 | Chan | H04L 61/5007 |
| 10,848,458 B2 | 11/2020 | Lo et al. | |
| 2024/0045796 A1 * | 2/2024 | Fux | G06F 11/0772 |

* cited by examiner

Primary Examiner — Jude Jean Gilles
(74) Attorney, Agent, or Firm — Hogan Lovells US LLP

(57) ABSTRACT

Systems and methods herein are for at least one circuit that can determine that a network reference associated with a first network hardware is subject to a network performance degradation in a network, can cause suspension of traffic flow associated with the network reference, can save configuration for at least the network reference at a node associated with the first network hardware, and can cause the configuration to be deployed in a second network hardware so that the network reference that was previously in the first network hardware is provided from the second network hardware to resume the traffic flow.

20 Claims, 7 Drawing Sheets

HARDWARE SUPPORTED FLOW MIGRATION

CROSS-REFERENCE TO RELATED APPLICATION(S)

This Non-Provisional Patent Application claims priority to U.S. Provisional Patent Application No. 63/553,947, filed Feb. 15, 2024, entitled "HARDWARE SUPPORTED FLOW MIGRATION," the full disclosure of which is hereby incorporated by reference herein in its entirety for all intents and purposes.

TECHNICAL FIELD

At least one embodiment pertains to communication in networks using hardware to address network performance degradation.

BACKGROUND

A network may be a data network and may include multiple processing units of different host machines or nodes to provide a path for traffic and other communication. The processing units may be central processing units (CPUs), graphics processing units (GPUs), or data processing units (DPUs) that are in the different nodes and that may be networked together to provide at least part of the network. The network may be a high-speed network providing higher bandwidth and lower latency communications between the different host machines or nodes. At least the GPUs and the DPUs can be used to communicate and share data directly using a network, instead of going through a central processing unit (CPU), which can increase an overall performance of a system having such host machines and in such a network. Further, communications in these networks can occur using a series of interconnected gateways, switches, or routers, which are responsible for routing data packets between the host machines of the network. The gateways, switches, or routers may utilize internal hash functions at each route layer to determine egress ports of communication of packets from a host machine. However, such networks may require load balancing and resiliency that may be performed by algorithmic approaches that are substantially static.

DETAILED DESCRIPTION

Figure 1:
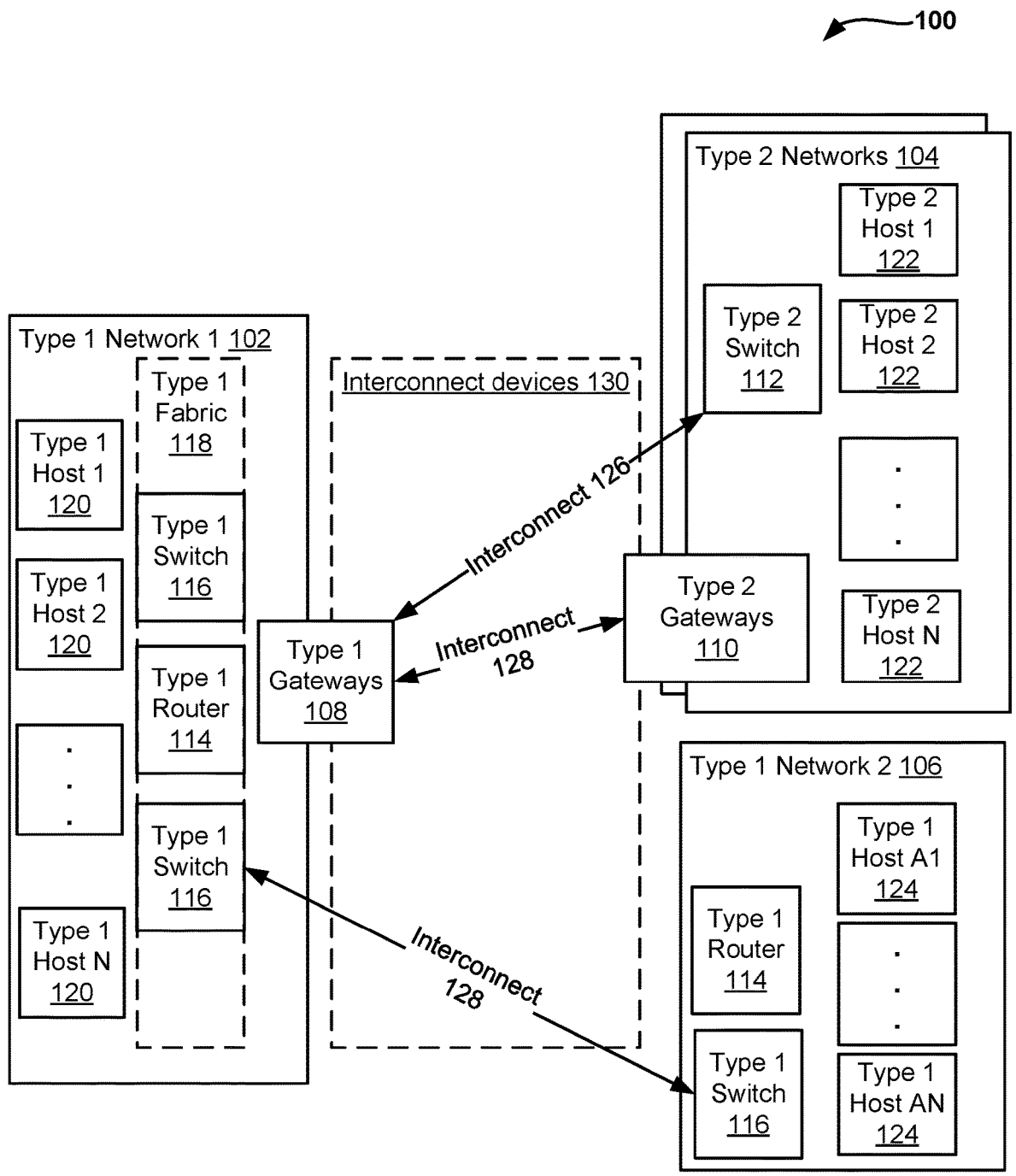
FIG. 1 illustrates a system that is subject to hardware supported flow migration, according to at least one embodiment.

In at least one embodiment, FIG. 1 illustrates a system 100 that is subject to hardware supported flow migration, as detailed herein. The system 100 can support dynamic load balancing or network aggregation by migrating configuration for part of a traffic flow performed using first network hardware that is subject to a network performance degradation, which is understood to also include functional degradation. Functional degradation can also be addressed as part of the network performance degradation because, while a malfunction may affect network performance, it may also only affect functional performance, but this also contributes generally to the network performance degradation as described throughout herein. Further, the first network hardware may include any network devices, including switches, routers, and gateways forming a path for traffic there through. Upon determination of network performance degradation associated with the first network hardware, the system 100 can cause the traffic flow to occur using the migrated configuration on second network hardware of the same node or of a different node. For example, the second network hardware may include at least one different network device from the first network hardware, which forms a different path for the traffic there through but that uses substantially the same configuration that was exposed by at least one of the first network hardware to an associated node that generates or consumes the traffic. The system 100 can support dynamic load balancing or network aggregation during the migrating of the configuration for a part of a network reference, such as a tuple or queue pair (QP) that is associated with a traffic flow, as described further with respect to FIGS. 2-7 herein. Further, it is understood that the QP may be a send-receive QP, in at least one embodiment.

The approaches herein can, therefore, address load balancing that may be performed otherwise by algorithmic approaches, which may be substantially static. For example, while load balancing can distribute network traffic across multiple nodes using an algorithm so that no single node is overloaded, this remains a substantially static process because it relies merely on rearranging existing paths (such as by virtual ports) or redistributing traffic in existing paths. There may be asymmetry in such load distribution. The approach herein that uses network references, such as a 5-tuple or a QP, which is migrated between network hardware to transfer substantially exposed configuration from one path to another. This enables a hardware-supported migration that involves an entire configuration of a subject network reference that is migrated to provide an entirely new physical path and that may be through a different node or different network hardware, but that uses substantially the same configuration of the subject network reference, for instance.

The network reference, such a tuple or QP, may be a set of values or a collection of features having the values that are specific to the network hardware and that are passed between the network hardware to enable the migrating of the configuration between the network hardware. In at least one embodiment, the features may include protocol information, source and destination address information, and port information. The protocol information may present a protocol associated with the network connection, such as Transmission Control Protocol/Internet Protocol (TCP/IP), Remote Directory Memory Access (RDMA) protocol, Infiniband® (IB) protocol, RDMA over Converged Ethernet (RoCE), or InfiniBand over Ethernet (IBoE) protocol. The address information may be an internet protocol (IP) address, in one instance.

Therefore, a network reference that is a 2-tuple may be an ordered pair or couple represented as a data structure with two components. A first of the two components may be a Boolean representation and a second of the two components may be a string representation. Together, the 2-tuple may be used as a representation of a network session and connection and may be used to identify security or performance issues. In at least one embodiment, however, as used herein, the network reference is a 5-tuple that may be represented as a data structure of five components. The five components may include a Boolean or string of a protocol at issue (such as, TCP/IP or any of the above referenced protocols, among other available protocols that may be also supported). The further components of the five components may include a Boolean or string of a source address, a source port number, a destination address, and a destination port number. The source address may be an IP address of a host in a network that creates and provides the message packet, whereas the destination address may be a recipient of the message packet. The network reference may also be used with load balancers.

In at least one embodiment, a 5-tuple may be used in identification of a network or connection, such as to secure and operate the network between two or more remote and local host machines (otherwise referred to herein as hosts) or nodes. A host may consume received traffic directly thereon and a node may be a host to consume the traffic received. However, a node may also be a component to consume the traffic indirectly. For example, the node can pass along the traffic to one or more hosts and may act on behalf of a host, as an indirect consumer of the traffic, or may directly consume the traffic for monitoring, configuration, and control purposes. For networking purposes herein, a host may be used interchangeably with a node, unless otherwise described. Further, a network reference may be accompanied by a sequence number. For example, 5-tuple/may be of sequence number 1 and 5-tuple 2 may be of sequence number 2. A network reference of a tuple having a sequence may be used to track a network having network flows with sequences of message packets. In addition, a sequence number may be used for message packets sharing the 5-tuple of the source address and port, destination address and port, and the type of protocol.

The network reference may be associated with at least one network hardware of a node, based on the part on the traffic flow being subject to network performance degradation. Then, the traffic flow may be caused to occur using the migrated configuration on at least one other network hardware of the node or of a different node but using the same or substantially the same network reference. For example, the values of the network reference are migrated to ensure that the traffic flow continues unhindered. In at least one embodiment, it is therefore understood that the traffic flow continuing unhindered may be also with respect to the committed data transactions that are not completed data transactions. The system is, therefore, hardware-supported at least by the use of network reference that is particular to network devices in one path of a network that exposed in a secure manner and that is migrated over from at least one network hardware of a node to another network hardware representing at least one different device of a different path. The different path, therefore, may be of the same network or a different network. In one example, a node may include one or more network interface cards (NICs) that communicate through at least one gateway to another node. The one or more NICs may be a further network hardware or device. The one or more NICs, together with a gateway, may enable different traffic flow that may be identified by different tuples or QPs.

When a network performance degradation is determined with respect to at least one network reference of the tuple or QP, the different traffic flow may become asymmetrical with respect to load balancing that may be initially within the network. The network reference subject to such network performance degradation may be migrated. To support migration, the traffic flow is suspended for at least the subject network reference and for its associated network hardware (including a first NIC). Then, configuration of the traffic flow of the subject network reference may be saved and the configuration may be deployed in different network hardware (including a second NIC) to provide the subject network reference through the different hardware.

In one example, the configuration of the traffic flow may include window size and acknowledgement information to send and receive packets, sequence numbers, acknowledgement number, and the like. All such information from at least one NIC of a subject network reference may be migrated to another NIC to provide a new network reference having the same configuration as the subject network reference and to carry over the traffic from the subject network reference. Therefore, there is no need to cause further setup for the NIC associated with the new network reference. The migration may be across nodes, as well as may be between NICs of a same node. Further, determination of the network performance degradation may be performed based in part on changes in message rates, in bandwidth, and in latency of packets within the different tuples of a network. In addition to all the above, the gateway between NICs may be notified of the migration by being required to update its forwarding tables. This approach is beneficial for distributed workloads, such as for Message Passing Interface (MPI) or for Symmetric Hierarchical Memory (SHMEM).

In at least one embodiment, the system 100 includes one or more type 1 networks 102, 106 that may be peer to peer high speed (HS) networks and may include one or more type 2 networks 104 that may be Ethernet networks. The type 1 networks 102, 106 may support one or more of RDMA or IB protocol to provide efficient and properly routed access using a type 1 switch 116 or using type 1 routers 114, between supported type 1 host machines 1-N 120, A1-AN 124. For example, the type 1 networks 102, 106 support use of a hash-based egress port selection for communication between a supported type 1 host machines and using a type 1 switch or router 114, 116 of a type 1 fabric 118. The type 2 networks 104 support Ethernet-based protocols for communication between type 2 host machines and using a type 2 switch 112. Further, there may be interconnect communications 126, 128 between the type 1 and the type 2 networks. The interconnect communications may be enabled using type 1 and type 2 gateways 108, 110 or switches 112 of provided interconnect devices 130. Such interconnect communications may be based in part on or may use RoCE or IBoE protocol.

In at least the type 1 networks, load balancing and resiliency can be achieved through different means and capabilities. Resiliency may be intended to allow network applications to continue their work seamlessly while experiencing network failures. Approaches to resiliency may include link aggregation (LAG), which combines two physical interfaces into a single logical interface. Further, hardware-based LAG solutions may also be provided to support resiliency. However, all such approaches may limit physical interfaces to be on the same hardware. In addition, software-based LAG solutions may be complex to implement and may not achieve speed performances to benefit the type 2 protocols described herein, such as RDMA and IB. For example, an active-passive mechanism performed at a software level, where different software can implement its own resiliency mechanism, requires such software to track a flow state and to know how to transfer such a flow state to a different NIC, if needed. Separately, in the case of hardware-based state tracking, there may be an overhead as each hardware has its own way of saving a flow state, which makes such approaches complex.

With respect to load balancing, this is may be performed to balance traffic through different paths and through different transport in order to avoid over-utilization of a network.

LAG used for load balancing may be performed in hardware or software. For hardware-based LAG solutions, there may be a limit to physical interfaces that can exist on the same hardware, whereas, for software-based LAG solutions there may be further complexities in implementation and in achieving speeds, in a similar manner as for resiliency. For example, for software-based load balancing, each software may implement its own load balancing mechanism, which leaves it to the software to determine load balance a priori. Such a requirement may result in an unbalance scheme. Moreover, all such approaches to load balancing and resiliency may be substantially static. For example, a user may be needed to configure and define conditions for the load balancing and resiliency before any networking process is done. This also cannot change as long as some networking process is in progress. There may be limits, as a result, from a user's perspective towards fixing a configuration while keeping an application operational.

The type 1 or type 2 networks 102, 104 in FIG. 1 may be subject to hardware supported flow migration to address also such issues and limitations. The hardware supported flow migration can also include resiliency and load balancing. For example, hardware supported flow migration allows hardware to expose a flow state of the network for migration. This allows the flow state to be loaded to other devices to perform the migration. While there are security constraints to prevent such exposure, the exposure herein is within secure environments of the trusted NIC or node, and the other network devices in a path. As such, there may be multiple network devices or hardware that can share configuration and network reference to the other devices by being trusted, for instance.

In one example, the flow migration capabilities of the hardware herein include at least four base commands through such trusted network devices or hardware. A suspend flow command can cause suspension of a traffic flow through one or more network devices or network hardware 108-116. As such, the suspension prevents certain ones of the one or more network devices 108-116 from receiving and transmitting traffic. This may be a result of network performance degradation associated with certain ones of the one or more network devices 108-116, and as determined by a software monitoring the traffic or the one or more network devices 108-116. The one or more network devices 108-116 can also be caused to resume the traffic flow from the suspension by a command at any time, if needed, as in the further descriptions herein.

A save flow command within at least one of the network devices 108-116 causes saving of a flow state to a provided data buffer that may be trusted or within a trusted device, such as a type 1 or type 2 host machine 120-124 associated with the traffic flow or one or more network devices 108-116 that is involved in the traffic flow. A load flow command is to cause loading of a flow state from the provided data buffer to one or more different ones of the network devices 108-116 that is not subject to network performance degradation, for instance. A resume flow command is to cause resumption of a previously suspended traffic flow from a time point of the suspension, where the resumption may occur using the flow state deployed at the different ones of the one or more network devices 108-116 that are not subject to network performance degradation. For example, there may be no issues known or monitored with respect to these other ones of the one or more network devices 108-116. Therefore, these different ones of the one or more network devices 108-116 may be newly deployed or may be an existing path in an existing network. Unless indicated otherwise, a path through a network may change by at least one different network device or hardware therein or the network itself may be considered changed by the at least one different network device or hardware therein.

In at least one embodiment, flow migration using such commands and involving multiple ones of the one or more network devices 108-116 allow overlying applications to achieve resiliency and load balance dynamically. For example, although traffic flow for an overlay application is suspended, for all intents and purposes, the overlay applications that generate or consume the traffic flow remain unaware of the suspension. Approaches herein, therefore, enable resiliency and load balance dynamically without compromising performance of the overlay application or without need to stop the overlay application.

Further, resiliency is additionally enabled by software that may track an actual flow state associated with a network interface, such as any of the one or more network devices 108-116. The software may determine an error that may be associated with network performance degradation of the network interface. However, it is understood that the error and the network performance degradation may not be limiting. For example, it is understood that a link failure may be also considered a network performance degradation that stops all the traffic and that is representative of a network performance degradation even if a network performance is at a zero rate and not at a value that is measurable. Upon determining the error, the software can suspend all of the flow state through the network interface, save the flow state to a buffer (such as reference buffer 240 in FIG. 2) of a trusted node or NIC, load the flow state from the buffer to another network interface of the one or more network devices 108-116 that is newly added or that is not subject to network performance degradation, and can resume traffic flow using the same flow state that is now on the other network interface.

In at least one embodiment, such migration may be performed in-node or between nodes that may be any one of the type 1 or type 2 host machines 120-124. With respect to load balancing, this may be also enabled by the same or different software to track the flow state of a network using its network interfaces. As in the case of resiliency, if the software performing the monitoring of the type 1 or type 2 networks 102-106 determines that one of the network interfaces, which include certain ones of the one or more network devices 108-116, does not hold its load and fails to provide a predetermined level of performance, load balancing may be supported by migrating some or all of the flow state to different network interfaces that include different ones of the one or more network devices 108-116. Then, traffic flow may be enabled through these different ones of the one or more network devices 108-116. This can also be done in-node, as a way to load balance on different network interfaces or can be done between nodes, as a way to load balance on different CPUs, GPUs, data processing units (DPUs), or other computation engines.

In at least one embodiment, in FIG. 1 a type 1 switch 116 or a type 1 router 114 can receive a communication that may be pertaining to traffic from an overlay application that is generated or to be consumed by the application. The traffic may be from a type 1 host machine 1-N 120; A1-AN 124 and may be provided using one or more interconnects 126, 128. The interconnections may be within a network or subnetwork of a same type or across networks of different types. Further, at least a type 1 network 102, 106 may include a centralized controller (CC) or a subnet manager (SM). The CC or SM may be available within each type 1 network or subnetwork. The CC or SM is to provide configuration information to its respective type 1 switches 116 or routers 114 of all available ports across all devices of the respective network or subnetwork.

The CC or SM (such as, reference SM/CC 304A in FIG. 3) may be combination of hardware and software or may be firmware features implemented on one type 1 switch, router, or gateway in a respective network or subnetwork, or in a type 1 host machine 1-N 120; A1-AN 124 of a respective network subnetwork. The configuration information may be provided as forwarding tables (such as, the example table marked FW Tb 304B of FIG. 3) to enable the respective type 1 switches or routers to use a hash for the determination or selection of the at least one of the available egress ports for the transmission of the data packet associated with the traffic flow, onwards from the type 1 switch or router to at least one receiving host machine or to a further routing layer. For example, the CC or SM may provide relevant portions of its configuration information to connected switches and routers to enable one or more paths in the type 1 networks.

Further, type 2 networks may use TCP/IP protocols for its routing. Load balancing in type 2 networks may be provided by a TCP load balancer. The TCP load balancer may be provided via a gateway having configuration information therein to enable the load balancing for TCP connections associated therewith. Here, it is understood that the TCP load balancer is a general reference to a layer 4 (L4 of an Open Systems Interconnection (OSI) standard) load balancer and that the L4 load balancer may also include UDP load balancers as load balancing decisions may be required to look at headers associated with the L4 layer. Therefore, it is understood that although UDP is a stateless protocol and may be less relevant for migration herein, the TCP load balancer may be an L4 load balancer provided via the gateway. Further, in either case of the type 1 or type 2 networks, the configuration information associated with a flow state may be suspended, migrated, and loaded in a new network interface to provide the configuration information from the new network interface to enable the same traffic flow that was in a prior network interface subject to network performance degradation.

In an example, a system 100 including a CC or SM may retain configuration information of its respective subnetwork, such as information about each port on each device within the subnetwork. This information may be obtained by a sweep performed periodically by the CC or SM of all its connected devices. In one example, a CC or SM in a type 1 subnetwork is a device that manages the communication between multiple type 1 host machines (or to and from a type 1 host machine), such as GPUs or CPUs, in a computer system, by acting as a central point of coordination for data transfer between the host machines. The CC or SM achieves this by configuring switches or routers to provide the interconnection 126, 128 of the various type 1 and type 2 networks. In at least one embodiment, the configuration information can include information about all the type 1 switches or routers in its subnetwork, such as connection status, available bandwidth, available egress ports, and data transfer rate. The information may be additionally pertaining to the data being transferred in a session, including forwarding rules, size of the data, the source and destination devices (such as by identification of host ports), and the priority of the data transfer. In at least one embodiment, configuration information in the CC or SM may also include error detection and correction aspects to manage and optimize the interconnections 126, 128.

In at least one embodiment, the CC or SM may receive information about its network or subnetwork via configuration information requests and responses that may be through the same interconnections 126, 128, but that may not be part of the traffic flow. The configuration information may be provided between the CC or SM and all host machines in at least the type 1 network or subnetwork, including the type 1 host machines or nodes and the switches or routers. The type 1 host machines, switches, or routers may each have an agent that are software components that are responsible for managing the communication between such type 1 devices, their internal operating system, and the CC or SM. The agents may be implemented as part of a device driver in each type 1 device and can interact with the CC or SM to control traffic flow between the type 1 devices. However, the traffic flow need not flow to the CC or SM or is at least ignored by the CC or SM. The configuration information may pass through the same ports of the connected devices as the traffic flow; however, the agents may recognize and respond to the configuration information while ignoring the traffic flow.

In at least one embodiment, an agent in each type 1 device may be responsible for managing the communication between that type 1 device and the CC or SM. However, the agent in each type 1 device may also be able to communicate amongst themselves in a subnetwork. In at least one embodiment, there may be agents in each type 1 devices, but at least in the case of the type 1 host machines, there may be an agent to communicate configuration information to the CC or SM, such as to inform about the host machines' available ports, for instance. In one example, the ports of a respective type 1 host machine may be also associated with a respective processing unit, such as a GPU or a DPU therein. This allows the respective processing unit to form a peer-to-peer network between host machines in a type 1 network or subnetwork. There may be at least one agent for each type 1 switch or router. The type 1 switch or router may include its respective ports for onward egress of traffic flow. The agent may be also responsible for implementing features such as error detection and correction, other than flow control and data prioritization. In at least one embodiment, the type 1 switches or routers may include respective ingress ports, where forwarding rules communicated from the CC or SM to the type 1 switch or router may include indications of which hash bits to use for selecting an egress port based in part on an ingress port that receives a packet to be forwarded to a receiving type 1 or type 2 host machine via one or more layers.

Figure 2:
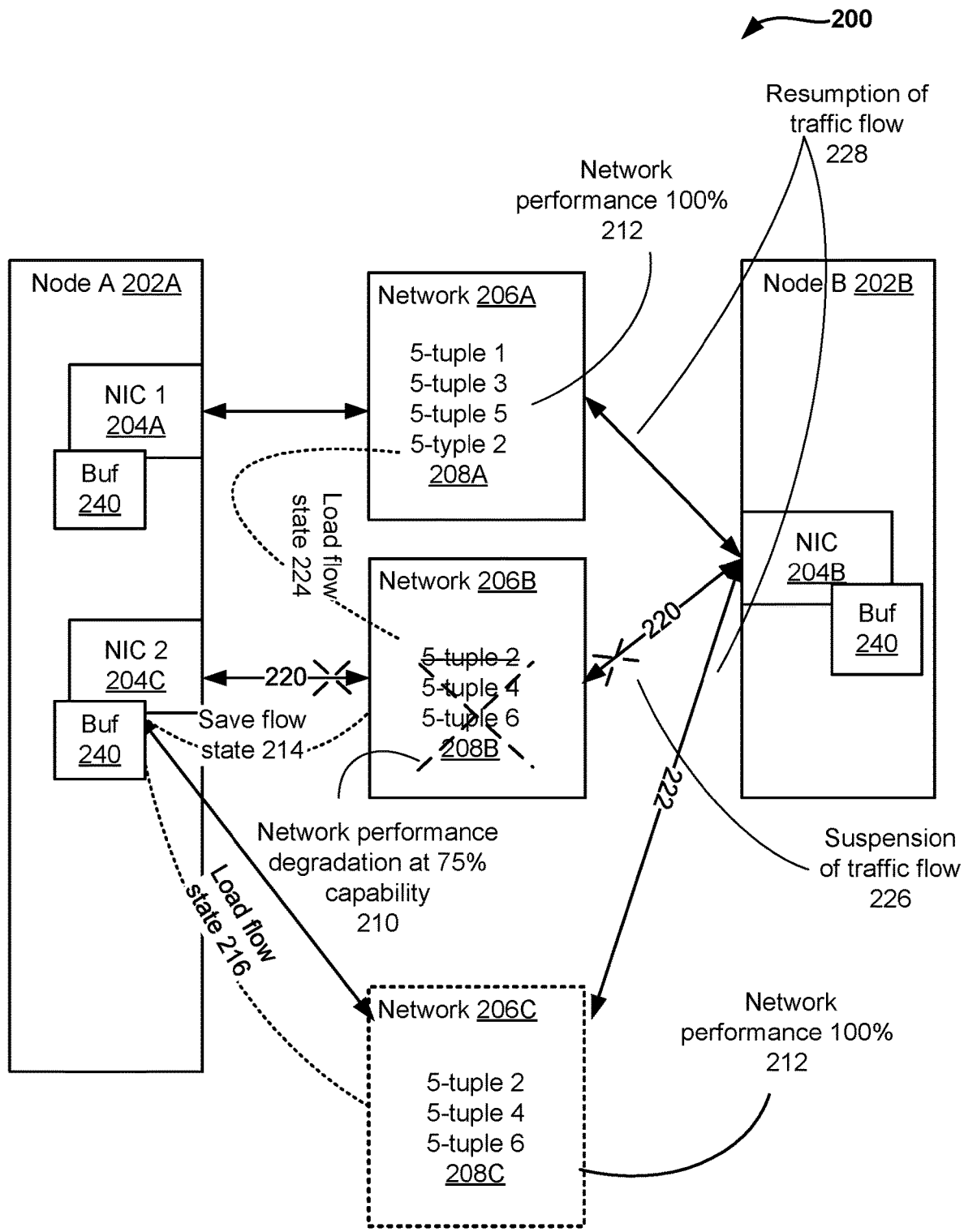
FIG. 2 illustrates aspects of a system for hardware supported flow migration in at least two nodes, according to at least one embodiment.

FIG. 2 illustrates aspects of a system 200 for hardware supported flow migration in at least two nodes, according to at least one embodiment. In the system 200, a node A 202A is able to communicate with node B 202B through multiple networks 206A, 206B, 206C that may also represent different paths and that may support one or more of resiliency or load balancing. Although illustrated as different networks 206A, 206B, 206C these may be different network paths having at least one different network device (such as a different switch, router, or gateway) there between. There may be multiple flow states involved in networks 206A, 206B, 206C of the system 200. For example, different NICs, such as NIC 1 204A, NIC 2 204C, may enable different flows there through for one node A 202A to communicate with another node B 202B through its respective NIC 204B. In addition, the multiple flow states may be provided through different network references associated with these different NICs. When the network references are tuples, there may be six tuples, represented as 5-tuple 1, 5-tuple 2, and so on till 5-tuple 6. There may be fewer or more tuples in other examples.

These network references may be distributed as illustrated, with 5-tuple 1, 5-tuple 3, and 5-tuple 5 208A provided using a path including NIC 1 204A and the first path through a first network 206A, between one node A 202A and another node B 202B; and with 5-tuple 2, 5-tuple 4, and 5-tuple 6 208B provided using a different path including NIC 2 204C and the second path through a second network 206B, between one node A 202A and another node B 202B. However, a network performance degradation 210 may be determined with respect to at least one path through the second network 206B, where the network performance is monitored at less than a predetermined network performance value, such as network performance 100% 212, as in the case of the other path through the first network 206A.

In at least one embodiment, the system 200 herein having at least one circuit, such as a CPU, GPU, or DPU of one or more switches, routers, or gateways, as described with respect to system 100 in FIG. 1, may be used to determine that the network references 208B associated with a first network hardware of the path through the second network 206B is subject to the network performance degradation 210. However, the at least one circuit may be associated with a NIC 1 204A, 2 204C of the node A 202A at issue, in at least one example. For example, the at least one circuit is a CPU, GPU, or DPU that is within a NIC or that is associated with a NIC of the node.

The at least one circuit can cause suspension 226 of traffic flow 220 associated with respect to one or more of the network references 208B. Then, the at least one circuit, being in the path of the second network 206B is trusted to receive or save 214 configurations for the network references 208B at the node A 202A associated with the first network hardware. For example, the configurations for the network references 208B may be already available in the node A 202A but may be saved to a trusted buffer 240 of the node A 202A. The at least one circuit can cause the configurations to be deployed in a second network hardware, by loading 216 the flow state to the second network hardware associated with a path through a further network 206C. Then, the network references 208C, which was previously with the first network hardware is provided from the second network hardware to resume 228 the traffic flow 222.

While all the tuples are illustrated as having been migrated, it is possible to only move certain network references as the network performance of the second network 206B may be still able to reach its intended capability under reduced traffic conditions with certain network references (and its related traffic) being migrated. Therefore, at least one circuit herein can cause one configuration of the one network reference to be deployed in an existing second network hardware of a first network 206A, by loading 224 at least one of the flow states (such as, with respect to 5-tuple 2 alone) to the existing second network hardware of an existing first network 206A. Then, the network reference 208C, which was with the first network hardware is provided from the existing second network hardware of the existing first network 206A to resume 228 the traffic flow 222. In at least one embodiment, the system 200 supports network references that are tuples or one of different QPs, where the different QPs may be represent by a single tuple.

Further, the flow state may pertain to different protocols as noted all throughout herein, including to at least user datagram protocol (UDP), TCP, RDMA, and IB. However, the UDP may not have a flow state, whereas the TCP, RDMA, and IB may have respective flow states for its traffic there through. In addition, while there may be software to monitor the network performance, the flow state is associated with each respective NIC at the hardware level and may be saved to a buffer 240 associated with the NIC and within a respective node. Further, although the traffic flow 220 is illustrated as having been suspended on both sides, the migration may be performed only one side, such as at node A 202A, with node B 202B being oblivious to any of the suspension or migration of the flow state.

Therefore, a 5-tuple 2 is a network reference that may be migrated via the loading 224 illustrated and may pertain to any one of flow states for at least TCP, RDMA, or IB. For at least TCP, the flow state pertains to information of the 5-tuple 2, including window size, acknowledgement information, and other such information to send, receive, and track packets. For at least RDMA, sequence numbers, including a receiving sequence number, acknowledgement numbers, record information, and other such information to send, receive, and track packets, may be part of the 5-tuple flow state that may be saved and migrated.

In an example, all such flow state may be saved from one of the NICs and may be migrated to another NIC, which is unlike software or hardware-based LAG solutions that may only perform load balancing as related to networking, using either new configuration or using software balances. Further, the migration herein can be done between different nodes altogether and not just between NICs of a single node, as illustrated in FIG. 2. While TCP may include a timeout of a certain time limit during suspension of traffic flow, such as 2 hours, which may also exist in the case of RDMA, the ability to perform migration occurs substantially faster than even a noticeable delay to applications associated with the traffic flow between the nodes.

In at least one embodiment, it is possible to monitor latency that is a packet-to-packet latency to determine if a there is or will be a spike due to network performance degradation issues. In addition, it is possible to use message rates, bandwidth, in addition or separately from latency, as a basis to monitor and to trigger the flow migration herein. Therefore, the migration may occur during the latency to ensure that the migration is not noticeable. While migration of a whole node is possible, including one or more NICs to a different node, it is also possible to migrate flow state of a single NIC or even a single network reference of one NIC.

In the case of virtual machine (VM) based applications, when a NIC fails, an application will fail, which can trigger a VM manager to cause migration. The migration in such an example will pertain to an entire VM that is migrated to a different host machine, but using the underlying hardware supported flow migration, it is also possible to use a different NIC as part of the VM manager-initiated migration.

In at least one embodiment, the illustrated NICs 1 204A and 2 204C may be dual port NICs that may be used in a LAG configuration. Therefore, in at least one embodiment, it is possible to switch to different ports along with the migration to a different node or to a different NIC. However, it is possible to maintain ports for a LAG configuration with the migrated flow state. Further, the approaches herein include notifying a CC or SM of the migrated network, although the flow state of the migrated network may incorporate the same identifiers from the prior network. In RDMA, a path migration may be performed to inform the CC or SM of the flow state that is migrated.

Figure 3:
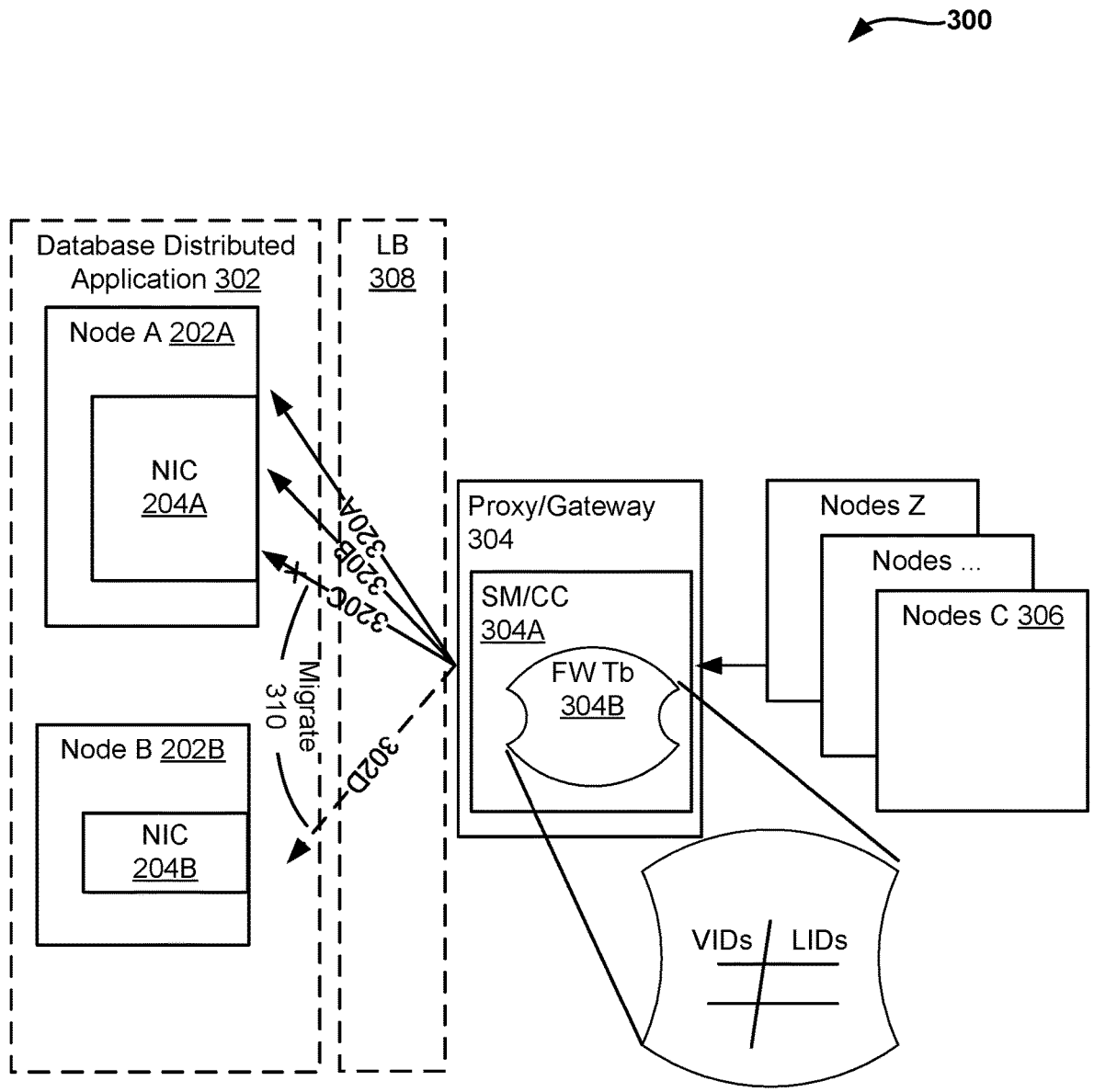
FIG. 3 illustrates further aspects of a system having a single application performing distributed workloads that is subject to hardware supported flow migration through a proxy or a gateway of a network, according to at least one embodiment.

FIG. 3 illustrates further aspects of a system 300 having a single application performing distributed workloads that is subject to hardware supported flow migration through a proxy or gateway of a network, according to at least one embodiment. In one example, the single application may be a database distributed application 302 performing distributed workloads on different nodes, such as node A 202A and node B 202B having respective NICs 204A, 204B. The distributed workloads may be associated with MPI or SHMEM. The distributed application benefit from symmetry in terms of its network, its nodes, and its operations. However, a benefit of hardware supported flow migration is that the distributed application may be modified to work in an asymmetric manner without loss of functionality.

When the distributed application or its associated manager determines a network performance degradation in one of the nodes performing the distributed application, the distributed application or its associated manager can trigger the migration using a NIC of one of the hosts that is closest to the network performance degradation as determined by message rates or other appropriate processes. In one example, for a database distributed application 302, may be associated with different client applications on different nodes C-Z 306. There may be a proxy or gateway 304 to perform the load balancing (LB) 308 to distribute workload associated with database distributed application 302. The proxy or gateway 304 may perform the load balancing according to a mathematical distribution, such as anelastic spherical harmonic (ASH). However, when the distribution may be performed to a single node, such as node A 202A using different paths indicated by the LB 308 aspect herein.

When the proxy or gateway 304 determines that one of the paths is subject to a network performance degradation, the proxy or gateway 304 can cause the local NIC 204A of that node to perform the migration 310 of the path, by its network reference, to another node, such as node B 202B that has at least the distributed workload in a redundancy operation and only needs the flow state from the migration to resume the traffic without interruptions detected by the database distributed application 302. However, it is also possible for one or more of the nodes performing the database distributed application 302 to cause or trigger the migration to occur.

In at least one embodiment, therefore, the system 300 is such that first network hardware associated with first path 320C of a network and second network hardware of second path 320D of a different network that may have at least one different network device relative to the first path 320C. Further, these paths may be associated with or may include at least the different NICs, such as the local NIC 204A of the first node A 202A and a different NIC 204B of the second node B 202B. In addition, the different NICs 204A, 204B may be associated with forwarding tables (such as, the table abbreviated as FW Tb 304B in FIG. 3), in a CC or SM 304A, that may be updated based in part on the network reference associated with the second path 320D and that is provided from the second network hardware.

In at least one embodiment, the system 300 is such that configuration that is associated with all of the network references of a node that includes the network reference to be migrated can also be migrated, as described with respect to FIG. 2. The configuration of the first node A 202A that is migrated to a second node B 202B then includes the second network hardware that pertains to the second path 320D, by at least the different NIC 204B used. However, the second network hardware pertaining to the second path 320D may also include the second network hardware by virtue of using at least one different switch, router, or gateway that is not subject to the network performance degradation.

In a further example, at least part of a node A 202A performs a VM. Then, a VM manager associated with the node A 202A may be the one to cause the configuration for at least the network reference of a first path 320C to be saved along with further configuration for the VM. The VM manager can further cause the VM and the network reference of the first path 320C to be performed from a different node, such as a network reference provided for a second path 320D. In a further instance, at least once circuit that may be part of the proxy, gateway or node may be adapted to perform the monitoring of an interface state associated with the first network hardware. For example, network hardware that is associated with the first path 320C and every path 320A, 320B may be monitored. The at least one circuit can cause the suspension to apply to all of the network references associated with all the paths 320A-D of the underlying traffic flow. In at least one embodiment, the at least once circuit can also monitor a state of the network using different network hardware that includes the first network hardware of at least one of the paths 320A-D. The at least once circuit can determine that one of the different network hardware of one of the paths 320A-D fails or is about to fail. The at least one circuit can perform its load of a load balancing scheme using the paths that have not failed and can enable the load balancing scheme by the configuration to be deployed in a second network hardware of a different node or NIC, for instance.

Figure 4:
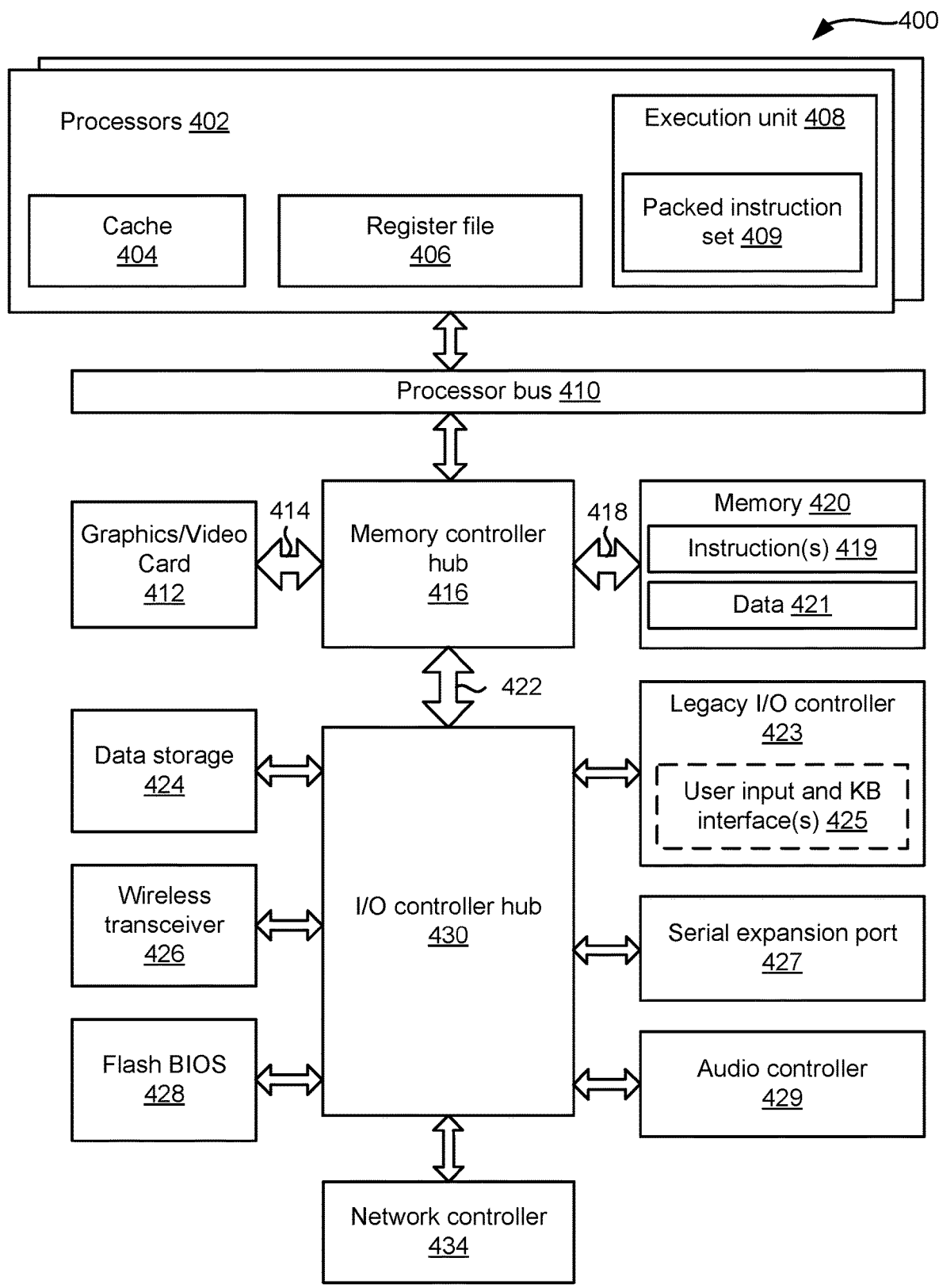
FIG. 4 illustrates computer aspects for hardware supported flow migration, according to at least one embodiment.

FIG. 4 illustrates computer aspects 400 for hardware supported flow migration, according to at least one embodiment. For example, each of the illustrated processors 402 may include one or more processing or execution units 408 that can perform any or all of the aspects of the system 100 for hardware supported flow migration by being part of a node of FIGS. 1-3 or part of a node, a NIC, proxy, or gateway of FIGS. 1-3. The processing or execution units 408 may include multiple circuits to support the aspects described herein for hardware supported flow migration. In at least one embodiment, the processors 402 may include CPUs, GPUs, DPUs that may be associated with a node, a NIC, a proxy, or a gateway of FIGS. 1-3. Further, the GPUs may be distinctly in distinct graphics/video cards 412, relative to a DPU that may be part of a NIC (represented by a network controller 434) and a CPU represented by the processors 402 illustrated in FIG. 4. Therefore, even though described in the singular, the graphics/video card 412 may include multiple cards and may include multiple GPUs on each card that are capable of communications using the protocols of the type 1 devices in FIGS. 1-3.

The computer and processor aspects 400 may be performed by one or more processors 402 that include a system-on-a-chip (SOC) or some combination thereof formed with a processor that may include execution units to execute an instruction, according to at least one embodiment. In at least one embodiment, the computer and processor aspects 400 may include, without limitation, a component, such as a processor 402 to employ execution units 408 including logic to perform algorithms for process data, in accordance with present disclosure, such as in embodiment described herein. In at least one embodiment, the computer and processor aspects 400 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, the computer and processor aspects 400 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, the computer and processor aspects 400 may include, without limitation, a processor 402 that may include, without limitation, one or more execution units 408 to perform aspects according to techniques described with respect to at least one or more of FIGS. 1-3 and 5-7 herein. In at least one embodiment, the computer and processor aspects 400 is a single processor desktop or server system, but in another embodiment, the computer and processor aspects 400 may be a multiprocessor system.

In at least one embodiment, the processor 402 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, a processor 402 may be coupled to a processor bus 410 that may transmit data signals between processors 402 and other components in computer and processor aspects 400.

In at least one embodiment, a processor 402 may include, without limitation, a Level 1 ("L1") internal cache memory ("cache") 404. In at least one embodiment, a processor 402 may have a single internal cache or multiple levels of internal cache. In at least one embodiment, cache memory may reside external to a processor 402. Other embodiments may also include a combination of both internal and external caches depending on particular implementation and needs. In at least one embodiment, a register file 406 may store different types of data in various registers including, without limitation, integer registers, floating point registers, status registers, and an instruction pointer register.

In at least one embodiment, an execution unit 408, including, without limitation, logic to perform integer and floating point operations, also resides in a processor 402. In at least one embodiment, a processor 402 may also include a microcode ("ucode") read only memory ("ROM") that stores microcode for certain macro instructions. In at least one embodiment, an execution unit 408 may include logic to handle a packed instruction set 409.

In at least one embodiment, by including a packed instruction set 409 in an instruction set of a general-purpose processor, along with associated circuitry to execute instructions, operations used by many multimedia applications may be performed using packed data in a processor 402. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, an execution unit 408 may also be used in microcontrollers, embedded processors, graphics devices, DSPs, and other types of logic circuits. In at least one embodiment, the computer and processor aspects 400 may include, without limitation, a memory 420. In at least one embodiment, a memory 420 may be a Dynamic Random Access Memory ("DRAM") device, a Static Random Access Memory ("SRAM") device, a flash memory device, or another memory device. In at least one embodiment, a memory 420 may store instruction(s) 419 and/or data 421 represented by data signals that may be executed by a processor 402.

In at least one embodiment, a system logic chip may be coupled to a processor bus 410 and a memory 420. In at least one embodiment, a system logic chip may include, without limitation, a memory controller hub ("MCH") 416, and processors 402 may communicate with MCH 416 via processor bus 410. In at least one embodiment, an MCH 416 may provide a high bandwidth memory path 418 to a memory 420 for instruction and data storage and for storage of graphics commands, data, and textures. In at least one embodiment, an MCH 416 may direct data signals between a processor 402, a memory 420, and other components in the computer and processor aspects 400 and to bridge data signals between a processor bus 410, a memory 420, and a system I/O interface 422. In at least one embodiment, a system logic chip may provide a graphics port for coupling to a graphics controller. In at least one embodiment, an MCH 416 may be coupled to a memory 420 through a high bandwidth memory path 418 and a graphics/video card 412 may be coupled to an MCH 416 through an Accelerated Graphics Port ("AGP") interconnect 414. In at least one embodiment, the graphics/video card 412 may be coupled to one or more of the processors 402 via a PCIe interconnect standard. Similarly, a network controller 424 may also be coupled to one or more of the processors 402 via a PCIe interconnect standard.

In at least one embodiment, the computer and processor aspects 400 may use a system I/O interface 422 as a proprietary hub interface bus to couple an MCH 416 to an I/O controller hub ("ICH") 430. In at least one embodiment, an ICH 430 may provide direct connections to some I/O devices via a local I/O bus. In at least one embodiment, a local I/O bus may include, without limitation, a high-speed I/O bus for connecting peripherals to a memory 420, a chipset, and processors 402. Examples may include, without limitation, an audio controller 429, a firmware hub ("flash BIOS") 428, a wireless transceiver 426, a data storage 424, a legacy I/O controller 423 containing user input and keyboard interface(s) 425, a serial expansion port 427, such as a Universal Serial Bus ("USB") port, and a network controller 434. In at least one embodiment, data storage 424 may comprise a hard disk drive, a floppy disk drive, a CD-ROM device, a flash memory device, or other mass storage device.

In at least one embodiment, FIG. 4 illustrates computer and processor aspects 400, which includes interconnected hardware devices or "chips", whereas in other embodiments, FIG. 4 may illustrate an exemplary SoC. In at least one embodiment, devices illustrated in FIG. 4 may be interconnected with proprietary interconnects, standardized interconnects (e.g., PCIe) or some combination thereof. In at least one embodiment, one or more components of the computer and processor aspects 400 that are interconnected using compute express link (CXL) interconnects.

Therefore, the at least one execution unit 408 may be a circuit of at least one processor 402 to be associated with a node, a NIC, or a gateway, which may each be a network device or hardware, also described with respect to one or more of FIGS. 1-3. The at least one network hardware can enable determination of a network reference which is subject to a network performance degradation in a network. The at least one network hardware can also support suspension of traffic flow through the network for the network reference. Then, configuration may be provided for at least the network reference to a node, where the configuration can be deployed in a further network hardware of a different node. As the node is part of a secure or trusted device within the network, the network reference is exposed thereto and can be provided or used from the further network hardware to resume the traffic flow.

Further, the further network hardware can enable a network reference to resume a traffic flow that was suspended from using a different network hardware in a network based in part on a determination that the network reference was subject to a network performance degradation in the network when using the different network hardware. In particular, as the network reference includes migrated configuration from the different network hardware, the further network hardware can enable the network reference from therein based in part on the migrated configuration deployed to the further network hardware, for the network reference. In at least one embodiment, the different and the further network hardware may include at least separate NICs. Further, the separate NICs are associated with at least one gateway that includes updated forwarding tables based in part on the network reference being provided from the different network hardware.

Figure 5:
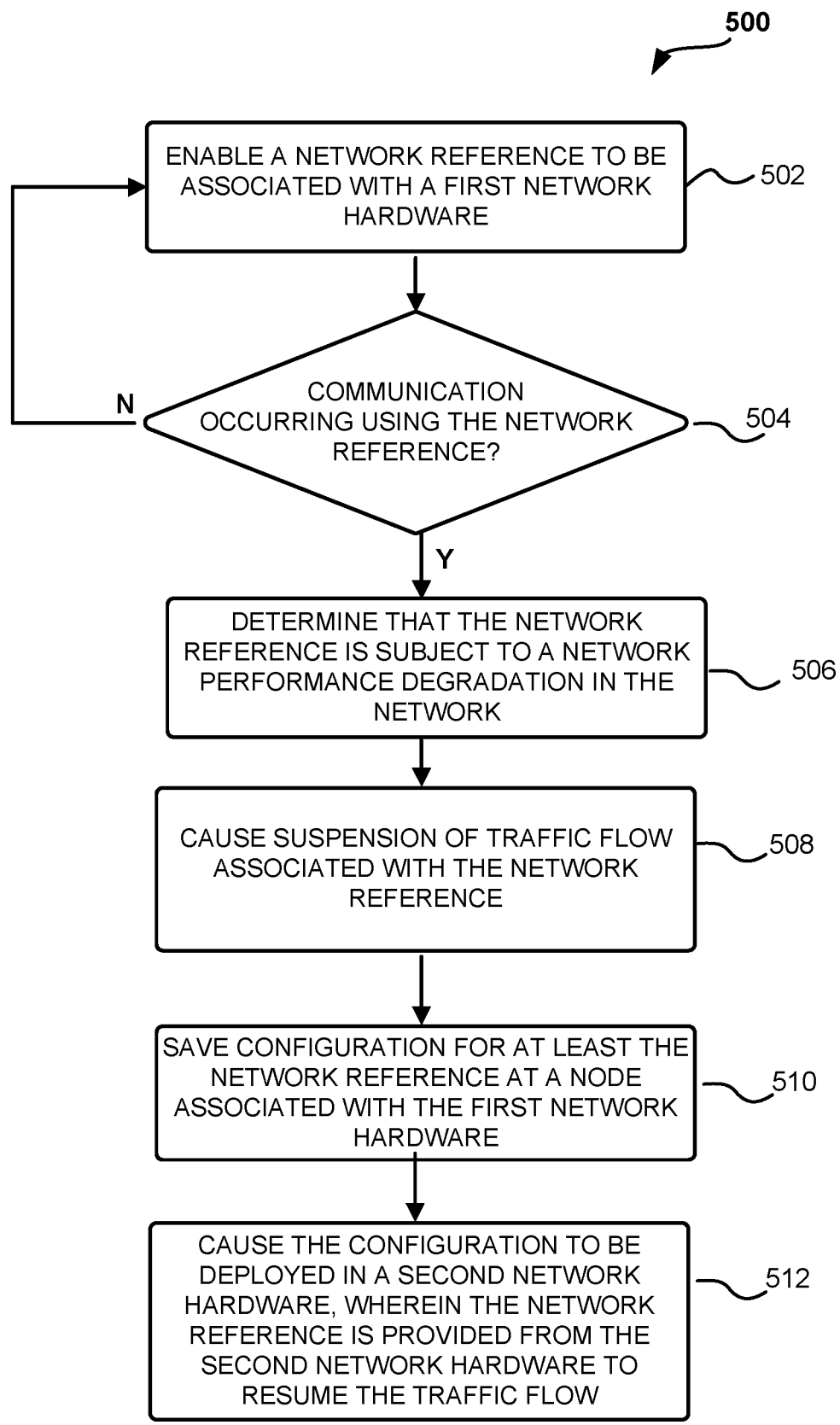
FIG. 5 illustrates a process flow for a system for hardware supported flow migration, according to at least one embodiment.

FIG. 5 illustrates a process flow or method 500 for a system for hardware supported flow migration, according to at least one embodiment. The method 500 is for a network that includes at least one circuit to enable 502 a network reference to be associated with a first network hardware, such as a first NIC and one or more routers, switches, and a gateway. In one example, the at least one circuit may be part of a node or a gateway and may be associated with an SM or a CC to enable 502 the network reference to be associated with the first network hardware. The method 500 includes determining or verifying 504 that communication is occurring using the network reference. For example, the determining or verifying 504 may be performed by a software that monitors for the communication and that monitors for network performance of the network. The method 500 includes determining 506 that the network reference associated with the first network hardware is subject to a network performance degradation in the network.

The method 500 includes causing 508 suspension of traffic flow associated with the network reference. The method 500 includes saving 510 configuration for at least the network reference at a node associated with the first network hardware. The method 500 also includes causing 512 the configuration to be deployed in a second network hardware. The network reference can be provided from the second network hardware to resume the traffic flow. For example, a tuple or a QP that is associated with a first network hardware may include a Boolean or string of a protocol at issue, a source address, a source port number, a destination address, and a destination port number. This information may be part of the configuration that may include window size, acknowledgement information, sequence numbers, including a receiving sequence number, acknowledgement numbers, record information, and other such information to send, receive, and track packets.

In at least one embodiment, the method 500 may include a further step or step in which the first network hardware and the second network hardware include different NICs. Further, the different NICs may be associated with at least one gateway that includes updated forwarding tables based in part on the network reference being provided from the second network hardware. In at least one embodiment, the method 500 may include a further step or step in which the determining of the network reference which is subject to the network performance degradation may be based in part on a change in a message rate, a bandwidth, or a latency of the network performing the traffic flow. This may be part of at least the determining 506 step for the network performance degradation, as well as for the prior determining or verifying 504 step for the communication and the network, generally.

Figure 6:
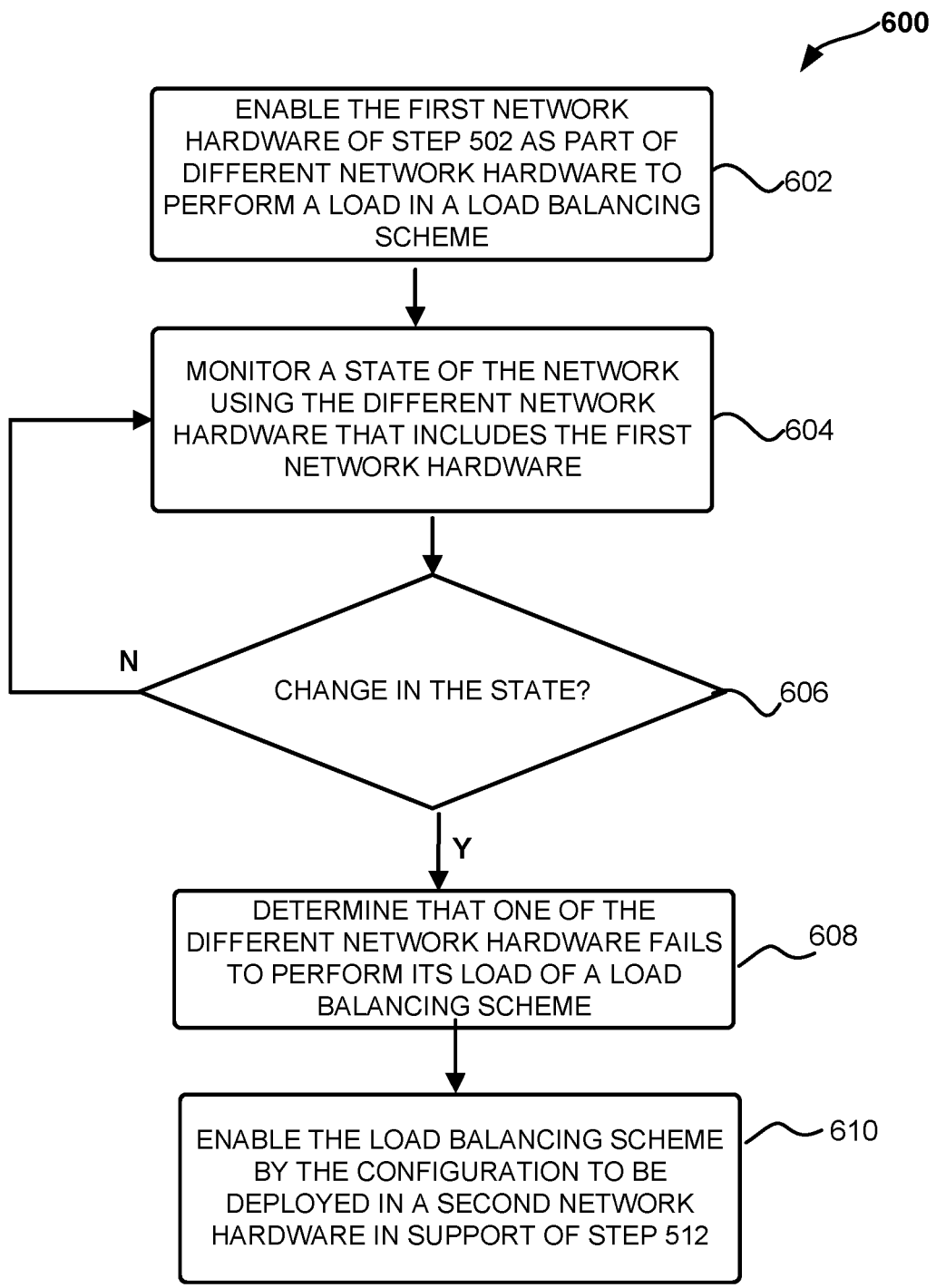
FIG. 6 illustrates a further process flow for a system for hardware supported flow migration, according to at least one embodiment.

FIG. 6 illustrates a further process flow or method 600 for a system for hardware supported flow migration, according to at least one embodiment monitoring a state of the network using different network hardware that includes the first network hardware. The method 600 may be performed in support or distinctly from the method 500 of FIG. 5. The method 600 in FIG. 6 includes enabling 602 the first network hardware of step 502, as part of different network hardware, to perform a load in a load balancing scheme. The method 600 includes monitoring 604 a state of the network using the different network hardware that includes the first network hardware. The method 600 includes determining or verifying 606 that a change in state has occurred in the network. The change in state may be associated with a change in a message rate, a bandwidth, or a latency of the network performing the traffic flow, in support of the determining 506 step in FIG. 5. The method 600 in FIG. 6 includes determining 608 that one of the different network hardware fails to perform its load of a load balancing scheme. The method 600 includes enabling 610 the load balancing scheme by the configuration to be deployed in a second network hardware, which is in support of the causing 512 step in FIG. 5.

Figure 7:
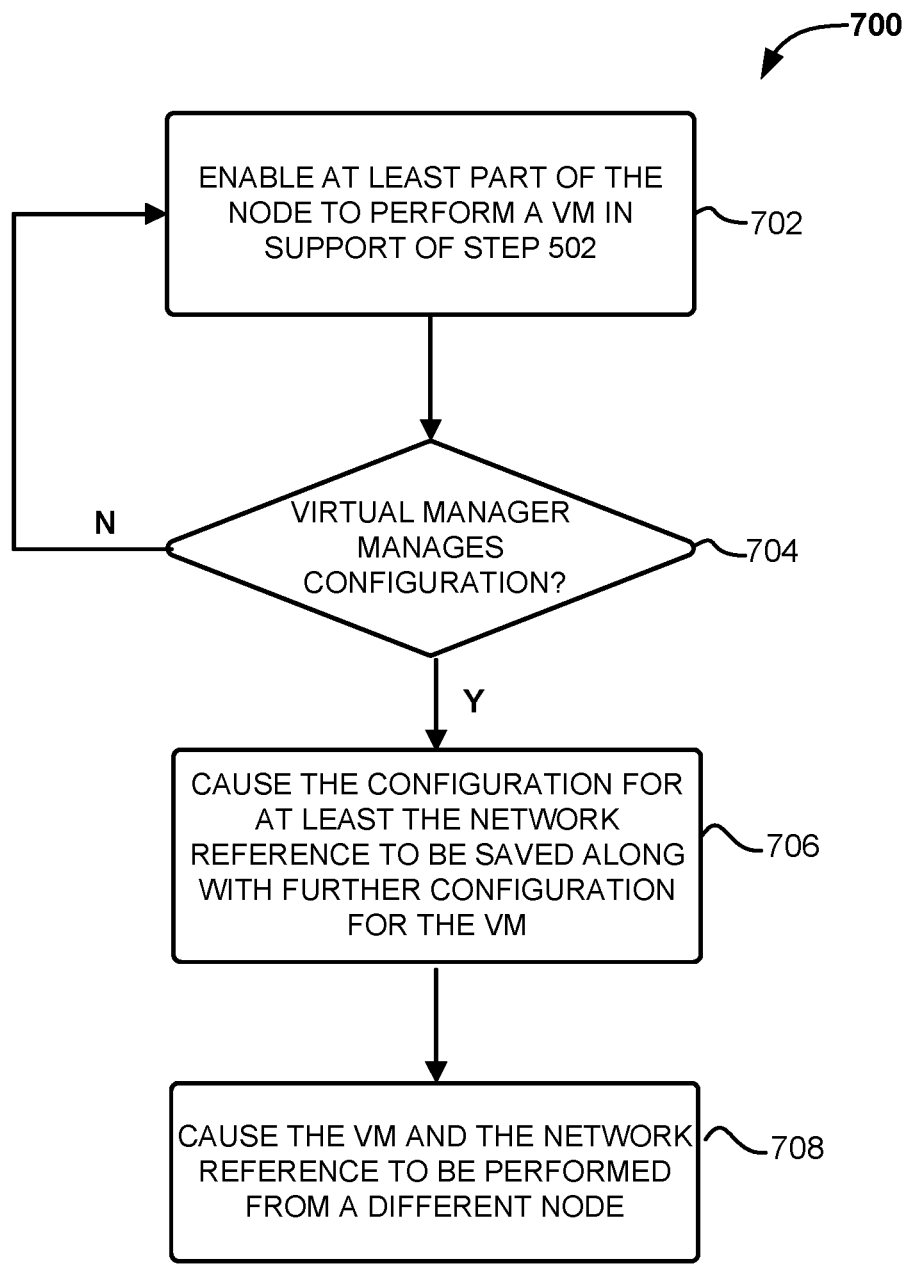
FIG. 7 illustrates yet another process flow for a system for hardware supported flow migration, according to at least one embodiment.

FIG. 7 illustrates yet another process flow or method 700 for a system for hardware supported flow migration, according to at least one embodiment. Like in the case of the method 600 in FIG. 6, the method 700 in FIG. 7 may be performed in support or distinctly from the methods 500, 600 of FIGS. 5 and 6. The method 700 in FIG. 7 includes enabling 702 at least part of a node to perform a VM in support of step 502 for a network reference to be associated with first network hardware so that the VM can process traffic using the first network hardware. The method 700 includes verifying 704 that a VM manager manages the VM. For example, this step may be performed when it is determined to migrate the VM and control for the migration has to be shared with the VM manager. The method 700 includes causing 706 the configuration for at least the network reference to be saved along with further configuration for the VM. The method 700 includes causing 708 the VM and the network reference to be performed from a different node, in support of the causing 512 step in FIG. 5.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors.

In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

Accordingly, in at least one embodiment, computer systems are configured to implement one or more services that singly or collectively perform operations of processes described herein and such computer systems are configured with applicable hardware and/or software that allow performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. References may also be made to providing, outputting, transmitting, sending, or presenting analog or digital data. In at least one embodiment, processes of providing, outputting, transmitting, sending, or presenting analog or digital data can be accomplished by transferring data as an input or output parameter of a function call, a parameter of an application programming interface or inter-process communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising at least one circuit to determine that a network reference associated with a first network hardware is subject to a network performance degradation in a network, to cause suspension of traffic flow associated with the network reference, to save configuration for at least the network reference at a node associated with the first network hardware, and to cause the configuration to be deployed in a second network hardware, wherein the network reference is provided from the second network hardware to resume the traffic flow.

2. The system of claim 1, wherein the network reference is a tuple or one of a plurality of queue pairs represented by the tuple.

3. The system of claim 1, wherein the first network hardware and the second network hardware include different network interface cards (NICs), and wherein the different NICs are associated with at least one gateway that comprises updated forwarding tables based in part on the network reference being provided from the second network hardware.

4. The system of claim 1, wherein the determination of the network reference which is subject to the network performance degradation is based in part on a change in a message rate, a bandwidth, or a latency of the network performing the traffic flow.

5. The system of claim 1, wherein the configuration is associated with all of a plurality of network references of the node that includes the network reference and wherein the configuration of the node is migrated to a second node that comprises the second network hardware.

6. The system of claim 1, wherein at least part of the node performs a virtual machine (VM), wherein a VM manager is to cause the configuration for at least the network reference to be saved along with further configuration for the VM, and wherein the VM manager is further to cause the VM and the network reference to be performed from a different node.

7. The system of claim 1, wherein the at least one circuit is further to monitor an interface state associated with the first network hardware, and to cause the suspension to apply to all of a plurality of network references of the traffic flow.

8. The system of claim 1, wherein the at least one circuit is further to monitor a state of the network using different network hardware that includes the first network hardware, to determine that one of the different network hardware fails to perform its load of a load balancing scheme, and is to enable the load balancing scheme by the configuration to be deployed in the second network hardware.

9. At least one network hardware to enable determination of a network reference which is subject to a network performance degradation in a network, to support suspension of traffic flow through the network for the network reference, to provide configuration for at least the network reference to a node, wherein the configuration is to be deployed in a further network hardware of a different node, and wherein the network reference is provided from the further network hardware to resume the traffic flow.

10. The at least one network hardware of claim 9, wherein the network reference is a tuple or one of a plurality of queue pairs represented by the tuple.

11. The at least one network hardware of claim 9, wherein the determination of the network reference which is subject to the network performance degradation is based in part on a change in a message rate, a bandwidth, or a latency of the network performing the traffic flow.

12. The at least one network hardware of claim 9, wherein the configuration is associated with all of a plurality of network references of the node that includes the network reference and wherein the configuration of the node is migrated to a second node that comprises the further network hardware.

13. The at least one network hardware of claim 9, wherein at least part of the node performs a virtual machine (VM), wherein a VM manager is to cause the configuration for at least the network reference to be saved along with further configuration for the VM, and wherein the VM manager is further to cause the VM and the network reference to be performed from a different node.

14. At least one network hardware to enable a network reference to resume a traffic flow that was suspended from using a different network hardware in a network based in part on a determination that the network reference was subject to a network performance degradation in the network when using the different network hardware, wherein the at least one network hardware is further to enable the network reference based in part on configuration deployed therein, for the network reference, from the different network hardware.

15. The at least one network hardware of claim 14, wherein the network reference is a tuple or one of a plurality of queue pairs represented by the tuple.

16. The at least one network hardware of claim 14, further comprising separate network interface cards (NICs) relative to the different network hardware in the network, and wherein the separate NICs are associated with at least one gateway that comprises updated forwarding tables based in part on the network reference being provided from the different network hardware.

17. A method for a network comprising at least one circuit, the method comprising:
 determining that a network reference associated with a first network hardware is subject to a network performance degradation in the network;
 causing suspension of traffic flow associated with the network reference;
 saving configuration for at least the network reference at a node associated with the first network hardware; and
 causing the configuration to be deployed in a second network hardware, wherein the network reference is provided from the second network hardware to resume the traffic flow.

18. The method of claim 17, wherein the first network hardware and the second network hardware include different network interface cards (NICs), and wherein the different NICs are associated with at least one gateway that comprises updated forwarding tables based in part on the network reference being provided from the second network hardware.

19. The method of claim 17, wherein the determining of the network reference which is subject to the network performance degradation is based in part on a change in a message rate, a bandwidth, or a latency of the network performing the traffic flow.

20. The method of claim 17, further comprising:
 monitoring a state of the network using different network hardware that includes the first network hardware;
 determining that one of the different network hardware fails to perform its load of a load balancing scheme; and
 enabling the load balancing scheme by the configuration to be deployed in the second network hardware.

* * * * *